United States Patent
Ray et al.

(10) Patent No.: US 11,361,676 B2
(45) Date of Patent: Jun. 14, 2022

(54) AUGMENTED REALITY TECHNIQUES FOR SIMULTANEOUSLY LEARNING MULTIPLE LANGUAGES

(71) Applicant: INTERNATIONAL BUSINESS MACHINES CORPORATION, Armonk, NY (US)

(72) Inventors: Shubhadip Ray, Secaucus, NJ (US); Sarbajit K. Rakshit, Kolkata (IN); Avik Sanyal, Kolkata (IN); Craig M. Trim, Ventura, CA (US)

(73) Assignee: International Business Machines Corporation, Armonk, NY, Armonk, NY (US)

( * ) Notice: Subject to any disclaimer, the term of this patent is extended or adjusted under 35 U.S.C. 154(b) by 395 days.

(21) Appl. No.: 16/441,825

(22) Filed: Jun. 14, 2019

(65) Prior Publication Data

US 2020/0394935 A1 Dec. 17, 2020

(51) Int. Cl.
*G09B 19/06* (2006.01)
*G09B 5/02* (2006.01)
(Continued)

(52) U.S. Cl.
CPC .............. *G09B 19/06* (2013.01); *G06F 3/011* (2013.01); *G06F 40/58* (2020.01); *G06T 19/003* (2013.01);
(Continued)

(58) Field of Classification Search
CPC ........... G09B 19/06; G09B 5/02; G06F 40/58; G06F 3/011; G06F 3/017; G06F 3/0346;
(Continued)

(56) References Cited

U.S. PATENT DOCUMENTS 5,169,316 A 12/1992 Lorman et al.
5,794,203 A 8/1998 Kehoe
(Continued)

FOREIGN PATENT DOCUMENTS

WO WO2018023506 2/2018

OTHER PUBLICATIONS

VictorFragoso,TranslatAR:Amobileaugmentedrealitytranslator,2011IEEE,11pages (Year: 2011).*
(Continued)

*Primary Examiner* — Jennifer N Welch
*Assistant Examiner* — Parmanand D Patel
(74) *Attorney, Agent, or Firm* — Schmeiser, Olsen & Watts, LLP; Brian Restauro

(57) ABSTRACT

A system and method for using augmented reality for assisting speech development of multiple languages includes analyzing speech recorded in an environment to detect a word used in a conversation between a first speaker and a second speaker that is in a language different from other words in the conversation, wherein a target user is in the environment with the first speaker and the second speaker, isolating an object associated with the word within an augmented reality environment of the target user located in the environment, determining a confusion level of the target user based on a use of the word in the conversation, and implementing, by the processor, an augmented reality technique based on the confusion level of the target user.

14 Claims, 14 Drawing Sheets

(51) Int. Cl.
*G10L 15/00* (2013.01)
*G10L 15/22* (2006.01)
*G06T 19/00* (2011.01)
*G06F 3/01* (2006.01)
*G06K 9/00* (2022.01)
*G08B 7/06* (2006.01)
*G06F 40/58* (2020.01)
*G06V 40/16* (2022.01)

(52) U.S. Cl.
CPC .......... *G06T 19/006* (2013.01); *G06V 40/174* (2022.01); *G08B 7/066* (2013.01); *G09B 5/02* (2013.01); *G10L 15/005* (2013.01); *G10L 15/22* (2013.01)

(58) Field of Classification Search
CPC ... G06F 40/205; G06F 40/263; G10L 15/005; G10L 15/22; G06T 19/006; G06T 19/003; G06K 9/00302; G06K 9/00885; G06K 9/00671; G08B 7/066
See application file for complete search history.

(56) References Cited

U.S. PATENT DOCUMENTS

| | | | |
|---|---|---|---|
| 6,714,911 | B2 | 3/2004 | Waryas et al. |
| 6,732,076 | B2 | 5/2004 | Masterson et al. |
| 10,638,248 | B1* | 4/2020 | Dodds .............. G10K 11/17813 |
| 2005/0112531 | A1 | 5/2005 | Maldonado et al. |
| 2007/0172805 | A1 | 7/2007 | Paul |
| 2008/0254431 | A1* | 10/2008 | Woolf ...................... G09B 5/00 434/322 |
| 2008/0271590 | A1 | 11/2008 | Lemons |
| 2009/0053681 | A1 | 2/2009 | Shen et al. |
| 2017/0017642 | A1 | 1/2017 | Cunningham et al. |
| 2017/0038943 | A1* | 2/2017 | Seligmann .............. H04S 3/002 |
| 2017/0090561 | A1* | 3/2017 | Dow ....................... G06F 21/32 |
| 2017/0098389 | A1 | 4/2017 | Liu |
| 2018/0151087 | A1* | 5/2018 | Wise ........................ G09B 5/06 |
| 2018/0277117 | A1 | 9/2018 | Hergenroeder |
| 2019/0235833 | A1* | 8/2019 | Xie ......................... G10L 15/26 |
| 2020/0134026 | A1* | 4/2020 | Lovitt ..................... H04R 3/005 |

OTHER PUBLICATIONS

M. Pu and Z. Zhong, "Development of a Situational Interaction Game for Improving Preschool Children' Performance in English-Vocabulary Learning." In Proceedings of the 2018 International Conference on Distance Education and Learning (ICDEL '18). ACM, 88-92, 2018.

C. Vazquez, "Serendipitous Language Learning in Mixed Reality" In Proceedings of the 2017 CHI Conference Extended Abstracts on Human Factors in Computing Systems (CHI EA '17). ACM, 2172-2179, 2017.

C. Chen, "Augmented Interface for Children Chinese Learning," Seventh IEEE International Conference on Advanced Learning Technologies (ICALT 2007), Niigata, 2007, pp. 268-270.

Mell, Peter et al.; "The NIST Definition of Cloud Computing;" National Institute of Standards and Technology; Special Publication 800-145; Sep. 2011; 7 pages.

* cited by examiner

AUGMENTED REALITY TECHNIQUES FOR SIMULTANEOUSLY LEARNING MULTIPLE LANGUAGES

TECHNICAL FIELD

The present invention relates to systems and methods for augmented reality techniques for developing speech, and more specifically the embodiments of an augmented reality system for using augmented reality to assist with speech development of individuals simultaneously learning multiple languages.

BACKGROUND

While learning to speak different languages simultaneously, it can be confusing when a conversation switches between languages.

SUMMARY

An embodiment of the present invention elates to a method, and associated computer system and computer program product for using augmented reality to assist with speech development of individuals simultaneously learning multiple languages. A processor of a computing system analyzes speech recorded in an environment to detect a word used in a conversation between a first speaker and a second speaker that is in a language different from other words in the conversation, wherein a target user is in the environment with the first speaker and the second speaker. An object associated with the word is isolated within an augmented reality environment of the target user located in the environment. A confusion level of the target user is determined based on a use of the word in the conversation. An augmented reality technique is implemented based on the confusion level of the target user.

DETAILED DESCRIPTION

Some people are exposed to multiple languages. As a result, the same object may be referred differently in different languages at home, daycare, school etc. or by different individuals around the person. There are conflicting theories of people being exposed to multiple languages while learning to speak. One theory suggests that people have more ability to pick up multiple languages at the age from 1-4 when people generally learn to speak meaningfully. Another theory suggests that multiple languages when spoken in front of people who are learning to speak can confuse and burden the person, thus delaying proper speech development. Yet another theory suggests that when same object or scenario or task is interpreted using different words in different languages, it can confuse a person who is unable to distinguish between languages. Confusion arising while learning to speak different languages at the same time is alleviated by embodiments of the present invention, which uses artificial intelligence and augmented reality for automated and optimized decisions for speech development specific to a person and the person's environment in a multi-language environment.

Figure 1:
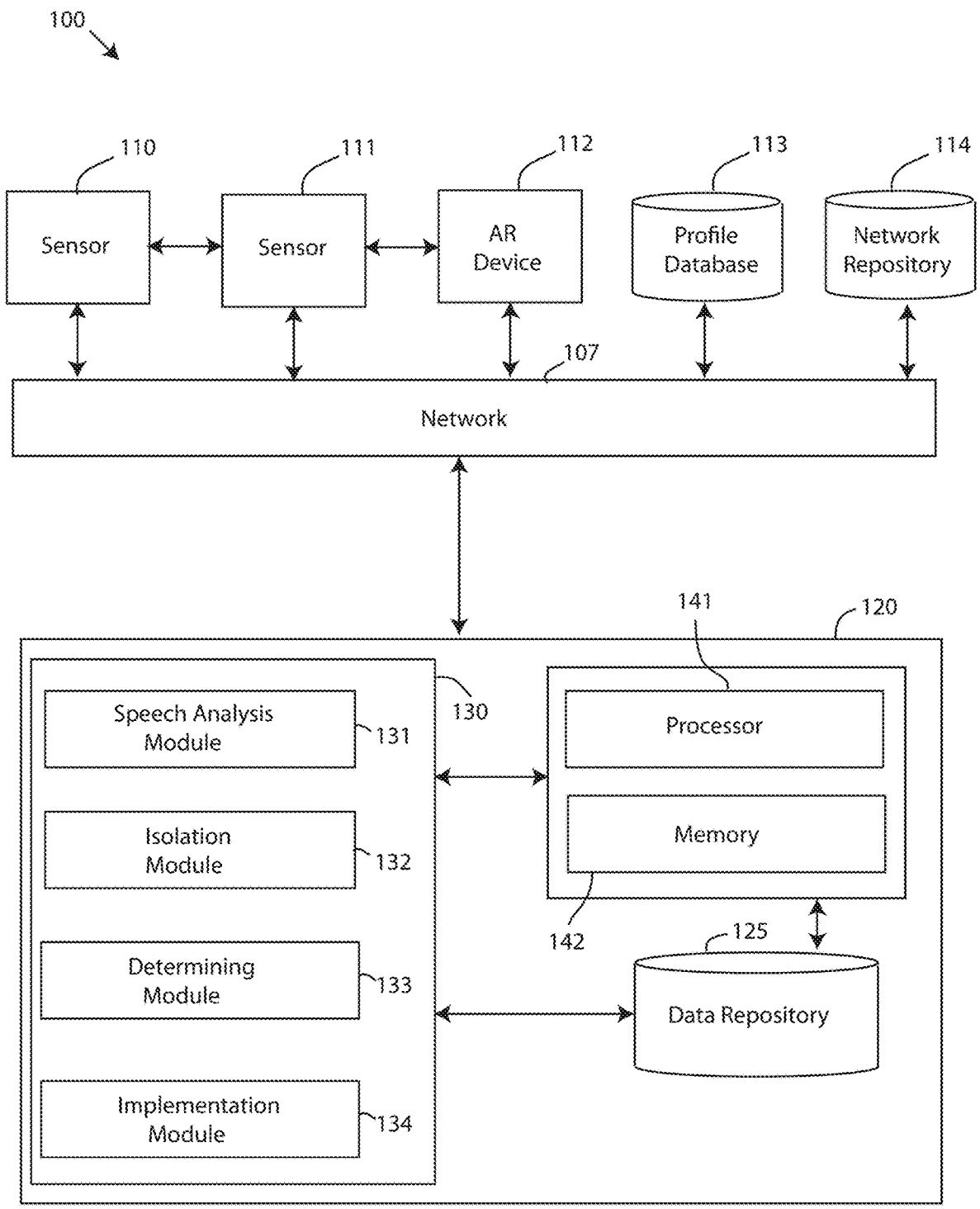
FIG. 1 depicts a block diagram of an augmented reality system, in accordance with embodiments of the present invention.

Referring to the drawings, FIG. 1 depicts a block diagram of an augmented reality system 100, in accordance with embodiments of the present invention. The augmented reality system 100 is a system for using augmented reality for assisting speech development of multiple languages. The augmented reality system 100 may be useful for scenarios where conversations may include words in two or more different language in the presence of a target user (e.g. child, student, etc.) that is learning to speak and/or learning a new language. Embodiments of the augmented reality system 100 may be alternatively referred to a speech development tool, a language learning system, a mixed language therapy system with augmented reality techniques, and the like.

In brief overview, embodiments of the augmented reality system 100 involves a cognitive system listening for a scenario where mixed speech is used in a conversation between two speakers, which might confuse a target user who is learning to speak. The target user is equipped with or others operates an augmented reality (AR) device (e.g. eye glasses) and wears the AR device or uses an application with AR capabilities on the target user's mobile device. Alternatively, the speakers, such as a parent, guardian, or teacher, is using a device with the AR application or wearing AR glasses. Once the augmented reality system 100 detects a mixed language condition (e.g. "Hey, look at that perro walking down the street"), the system uses augmented reality to identify the object (in this case the dog walking down the street) and show multiple words that can define that person or object along with the words language origin. The use of augmented reality will help the target user understand that the word, in this case "perro", isn't the English version of the word but in fact the Spanish version of "dog". The augmented reality system 100 clarifies for the target user that that there are two ways to say the same thing and which word matches the rest of the conversation. Further, input mechanisms, such as IoT sensors, microphone, camera etc. connected to the augmented reality system 100 can analyze the conversation from the surrounding, and if the system identifies that people are speaking in multiple languages, which might confuse the target user, then AI and AR systems will dynamically create gaming object movement, comparative level of interest of the target user on the game with respect to the conversation. Accordingly, based on the movement of the gaming object, the system 100 involves the target user to play the game and move away from the conversation environment, and using cognitive computing the target user's attention will be diverted from the multi-language conversation topic. The augmented reality system 100 analyzes a loudness of the multi-language conversation, and accordingly dynamically identifies the new position of the target user, so that the target user does not listen to the multi-language conversation.

The augmented reality sharing system 100 includes a computing system 120. Embodiments of the computing system 120 include a computer system, a computer, a server, one or more servers, a backend computing system, and the like.

Furthermore, the augmented reality system 100 includes input mechanism 110, input mechanism 111, an augmented reality device 112, and a profile database 113 that are communicatively coupled to the computing system 120 over a network 107. For instance, information/data is transmitted to and/or received from the input mechanism 110, the input mechanism 111, the augmented reality device 112, and the profile database 113 over a network 107. In an exemplary embodiment, the network 107 is a cloud computing network. Further embodiments of network 107 refer to a group of two or more computer systems linked together. Network 107 includes any type of computer network known by individuals skilled in the art. Examples of network 107 include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. In one embodiment, the architecture of the network 107 is a peer-to-peer, wherein in another embodiment, the network 107 is organized as a client/server architecture.

In an exemplary embodiment, the network 107 further comprises, in addition to the computing system 120, a connection to one or more network-accessible knowledge bases 114, which are network repositories containing information of the user preferences, selected or preferred languages, user's learning history, user performance, user study history, user activity, user predefined rules, specific language translation rules, user location, etc., network repositories or other systems connected to the network 107 that are considered nodes of the network 107. In an embodiment where the computing system 120 or network repositories allocate resources to be used by the other nodes of the network 107, the computing system 120 and network-accessible knowledge bases 114 is referred to as servers.

The network-accessible knowledge bases 114 is a data collection area on the network 107 which backs up and save all the data transmitted back and forth between the nodes of the network 107. For example, the network repository is a data center saving and cataloging the user preferences, selected or preferred languages, user's learning history, user performance, user study history, user activity, user pre-defined rules, specific language translation rules, user location, etc., and the like, to generate both historical and predictive reports regarding a particular user or a particular user augmented reality language and/or speech development, etc. In an exemplary embodiment, a data collection center housing the network-accessible knowledge bases 114 includes an analytic module capable of analyzing each piece of data being stored by the network-accessible knowledge bases 114. Further, the computing system 120 can be integrated with or as a part of the data collection center housing the network-accessible knowledge bases 114. In an alternative embodiment, the network-accessible knowledge bases 114 are a local repository that is connected to the computing system 120.

The sensors 110, 111 are a sensor, an input device, or any input mechanism. For example, sensor 110 and sensor 111 may be a combination of a biometric sensor, a wearable sensor, an environmental sensor, a camera, a camcorder, a microphone, a peripheral device, a computing device, a mobile computing device, such as a smartphone or tablet, facial recognition sensor, voice capture device, and the like. The sensors 110, 111 collect audio data, such as speech, from an environment. To collect the audio from the environment, the sensors 110, 111 are positioned within an environment shared by the target user and the speakers, worn by the speakers or target user, or otherwise disposed in a location that can result in obtaining voice data from a conversation. The collection of audio from a conversation is only done with the knowledge and consent of the speakers and the target user, and can be turned off at any time, thereby respecting the privacy of the speakers and the target user.

In an exemplary embodiment, sensor 110 is a microphone of a smart mobile phone of target user or speaker and sensor 110 is a camera positioned within the environment, such as a car or living room. Sensors 110, 110 can be two cameras that capture video data of a conversation, including voices, a posture, facial expressions, perspiration, muscle activity, gestures, etc. Sensors 110, 111 can be two microphones positioned nearby the speakers and the target user to collect audio relating to a conversation between speakers and a target user. While FIG. 1 depicts one sensor 110 and one sensor 111, the system 100 may include more than two sensors and different combinations of sensors. Further sensors 110, 111 that can be used with system 100 include other hardware input devices, such as an audio conversion device, digital camera or camcorder, voice recognition devices, graphics tablet, a webcam, VR equipment, and the like. Sensors 110, 111 also can include a mobile computing device, such as a smartphone or tablet device, which may run various applications that contain data about the target user and/or speakers. For example, a target user's smartphone may include a language learning application that may send progress data to the computing system 120, or may send relevant learned or mastered words to the computing system 120. The mobile computing device as used as sensor may also utilize the device's camera, microphone, and other embedded sensors to send information to the computing system 120. Moreover, embodiments of sensors 110 may encompass other input mechanisms, such as a user computer that may send information to the computing system 120, wherein the user computer may be loaded with software programs that are designed to track a productivity or work output level.

The augmented reality device 112 is an AR device that can be used by a first user for displaying AR in the target user's environment. The augmented reality device 112 is configured to be worn by the target user. In an exemplary embodiment, the augmented reality device 112 is a smart contact lens configured to be won directly in the eye of the first user, or eyeglasses worn on the head of the target user. In another exemplary embodiment, the AR device 112 is a mobile computing device of the target user 112 that includes one or more software or hardware capabilities to support AR. The AR device 112 supports AR and has necessary components for communicating with the computing system 120 and optionally the mobile devices of the target user and/or speakers. Furthermore, the AR device 112 generates an augmented reality experience for the user depending on the augmented reality technique determined by the computing system 120. For instance, a generation module of the AR device 112 and/or the computing system 120 generates, renders, creates, etc. the augmented reality experience within an environment containing the target user, as viewed by the target user using the AR device 112. The augmented reality experience is an interactive and immersive real-world environment that includes computer-generated perceptual information generated by the generation module so that the real-world environment is digitally manipulatable. The generation module is communicatively coupled to one or more sensors of the AR device 112 and/or the target user mobile device, such as a GPS sensor, digital camera, accelerometer, gyroscopes, solid state compasses, RFID, and optical sensors. The sensors of the AR device 112 and the target user mobile device provide location-based information, environmental details, mapping information, image data (e.g. from camera(s)), etc. which is used by the generation module in rendering the augmented reality experience within the environment. Additionally, the generating module utilizes environmental sensors 110, 111 that may be located within the environment, such as beacon devices for micro-location data, cameras.

Referring still to FIG. 1, the profile database 113 is a database, storage medium, blockchain database, and the like, that stores profile information of the target user and profiles of other users. The profile database 113 provides a cognitive storage ability for the history of the users.

Figure 2:
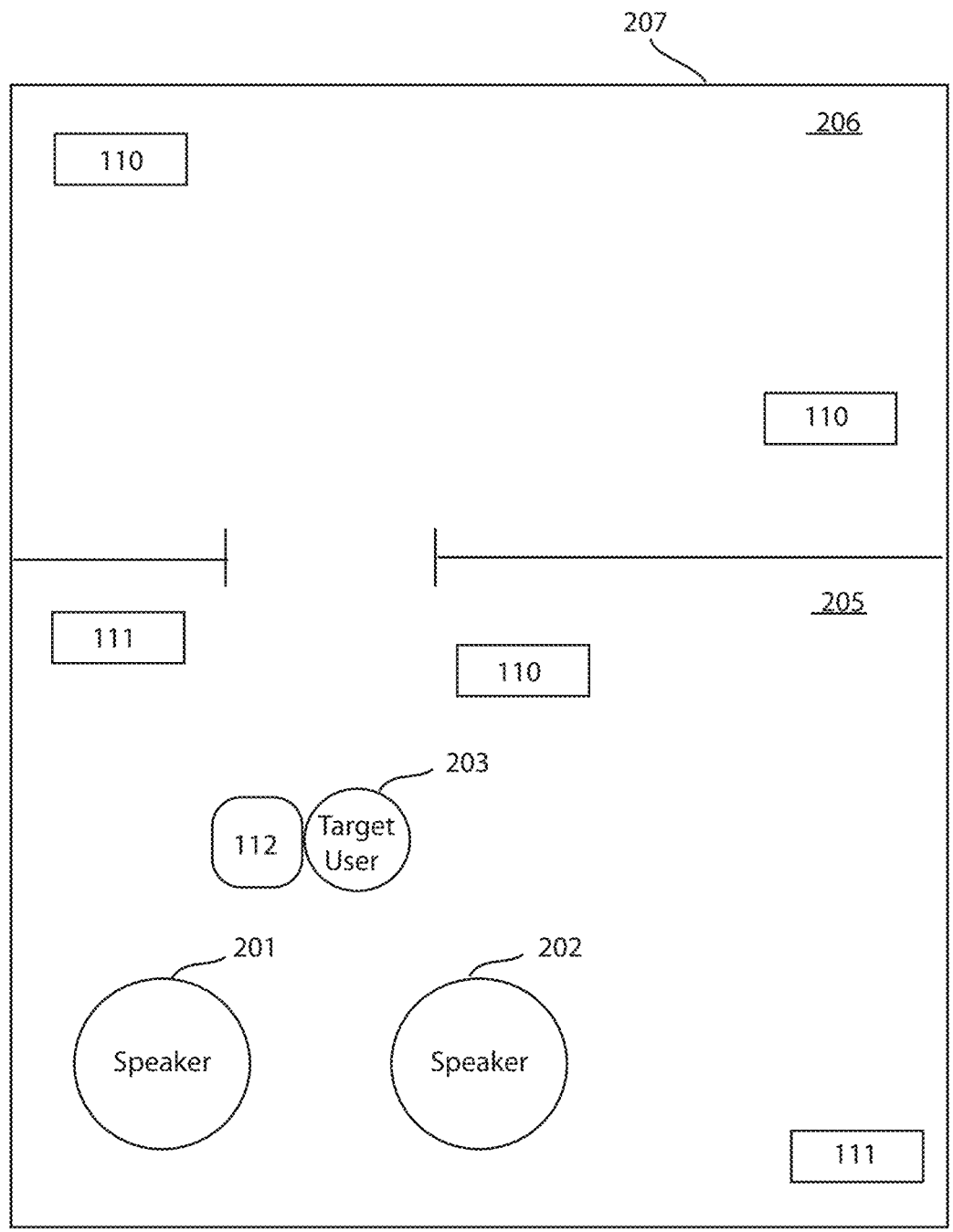
FIG. 2 depicts an environment shared by two speakers and a target user, in accordance with embodiments of the present invention.

FIG. 2 depicts an environment 207 shared by two speakers and a target user, in accordance with embodiments of the present invention. The environment 207 is a physical location in reality. The environment 207 is defined by one or more boundaries. The one or more boundaries defining the environment 207 can be a walls, surfaces, or other structures. Exemplary embodiments of environment 207 include one or more rooms of a house, a car, a floor of a building, an office, a kitchen of a restaurant, a classroom of a school. In the example shown in FIG. 2, the environment 207 includes a first space 205 and a second space 206 separated by a wall or similar partition. Moreover, the environment 207 can be a dynamic environment. The dynamic environment moves with the AR device 112. Exemplary embodiments of a dynamic environment include a physical area surrounding the AR device 112 that changes based on the physical location of the AR device 112 as the target user moves. The size of the surrounding area depends on a specific, set physical distance (e.g. 20 foot radius from the AR device 112). The AR device 112 is configured to communicate with various environmental sensors and/or micro-location devices (e.g. beacon devices) for improved location accuracy for indoor environments or large event structures, such as stadiums, arenas, etc.

Inside the environment 207, a first speaker 201 and a second speaker 202 are having a conversation. The target user 203 is also in the environment and can hear the conversation. The target user is equipped with an AR device 112, such as AR glasses worn on the target user's head. A plurality of sensors 110, 111 are disposed throughout the environment. The sensors 110, 111 include a microphone, a camera, a smart speaker, and a mobile phone of one of the speakers. In this example, the first speaker 201, the second speaker 202, and the target user 203 are in the same space 205 of the environment 207, and the sensors 110, 111, 111 are capturing the audio from a conversation between the first speaker 201 and the second speaker 202, and potentially with the target user 203. If the first speaker 201 speaks in a first language to the second speaker 202 during the conversation, but one word of the conversation is spoken in a different language, the target user may be confused. The confusion of the target user can be a hindrance to the target user's 203 development of the language. The system 100 determines whether the target user is confused and/or a level or degree of confusion of the target user 203, and takes action using augmented reality, as described in greater detail infra.

Referring back to FIG. 1, the computing system 120 of the augmented reality system 100 is equipped with a memory device 142 which stores various data/information/code, and a processor 141 for implementing the tasks associated with the augmented reality system 100. An augmented reality learning assistance application 130 is loaded in the memory device 142 of the computing system 120. The augmented reality learning assistance application 130 can be an interface, an application, a program, a module, or a combination of modules. In an exemplary embodiment, the augmented reality learning assistance application 130 is a software application running on one or more back end servers (e.g. computing system 120), servicing the augmented reality device 112 and potentially a linked personal user computing device, and potentially a mobile device associated with speakers surrounding the target user. In other embodiments, the augmented reality learning assistance application 130 is a software application running on the target user's mobile device controlling the augmented reality device 112. In further embodiments, aspects of the augmented reality learning assistance application 130 are loaded onto the computing system 120 and the target user mobile device.

The augmented reality learning assistance application 130 of the computing system 120 includes a speech analysis module 131, an isolation module 132, a determining module 133, and an implementation module 134. A "module" refers to a hardware-based module, a software-based module, or a module that is a combination of hardware and software. Hardware-based modules include self-contained components such as chipsets, specialized circuitry and one or more memory devices, while a software-based module is a part of a program code or linked to the program code containing specific programmed instructions, which is loaded in the memory device of the computing system 120. A module (whether hardware, software, or a combination thereof) is designed to implement or execute one or more particular functions or routines.

The speech analysis module 131 includes one or more components of hardware and/or software program code for analyzing speech recorded in an environment to detect a word used in a conversation between a first speaker and a second speaker that is in a language different from other words in the conversation. For instance, sensors 110, 111 capture, collect, record, etc. audio spoken by one or more speakers having a conversation proximate a target user. The speech analysis module 131 converts an audio file received from the sensors 110, 111 and/or mobile phones of the speakers or target users into text. The audio file is sent to the computing system 120, in response to collecting the audio from a real-world environment. As the speakers speak, one or more sensors 110, 111 (e.g. microphones) collect the audio and creates a digital audio file (e.g. creates a .mp3 pack) for transmitting to the computing system 120 over the network 107. The digital file may be packetized and sent over the network in real-time to increase the speed in which the computing system 120 receives and parses the audio file over the network 107. The one or more microphones, when powered on, can continuously listen for and collect audio of the conversation to listen for words in a different language than previous words (e.g. mixed language condition).

The speech analysis module 131 converts that audio file into text, and in response, parses the text to determine that a word used in a sentence is in a different language than the previous words in the sentence and the words after sentence. For example, the speech analysis module 131 uses speech-to-text software to convert the audio file into text. The language spoken by the user can also be detected using the speech-to-text software as well a translation API associated with a translator. The translator is a software application, engine, or tool for providing machine translations for words between languages. The computing system 120 may utilize the translator to translate the words into several languages. In an exemplary embodiment, the translator is a remote service accessed by the computing system 120 over network 107; however, a translation software application can be installed directly onto the computing system 120.

In response to converting the received audio file to text, the speech analysis module 132 parses the text using natural language processing techniques or comparable techniques to understand what words are being used in the conversation and which language the words are being spoken in. The parsing of the text can include detecting a change in language that can initiate a particular response by the computing system 120. The speech analysis module 131 can continuously parse the text as the audio file data is continuously received in real-time from the sensors 110, 111. Based on the natural language analysis, the speech analysis module 131 can determine that a word in a sentence is a different language than the previous words and potentially the words after.

The isolation module 132 includes one or more components of hardware and/or software program code for isolating an object associated with the word (i.e. word identified to be in a different language) within an augmented reality environment of the target user located in the environment. For example, the isolation module 132 searches for an object in the environment 207 that correlates to the word detected as a function of the analyzing. The object is searched by the isolation module 132 by processing environmental data received from a plurality of sensors 110, 111 installed in the environment 111. In an exemplary embodiment, an image recognition engine is used to locate and identify objects in the environment, based on data provided by a camera sensor located in the environment or the camera associated with the AR device 112. If the object is physically present in the environment, the isolation module 132 alerts the target user to a location of the object within the environment. Alerting the target user to the object may include rendering an indicator in the augmented reality environment showing the target user where the object is, or may include rendering an outline superimposed over the object so that the target user knows precisely which object the word is associated with. If the object is not physically present in the environment, the isolation module 132 generates the object in an augmented reality environment/experience of the target user that correlates to the word detected as a function of the analyzing. Accordingly, the isolation module 132 isolates the object that correlates to the mixed language word identified by the speech analysis module 131; the isolation performed by the isolation module 132 is output as a rendering by the AR device 112 of the target user, such that only the target user using the AR device 112 can visualize the rendering that isolates the object.

The isolation module 132 optionally pre-captures the environment using the sensors 110, 111 and/or the AR device 112. For instance, the sensors 110, 111 and/or the AR device 112 gathers and registers information from the surroundings that include the spoken content, people present, surrounding navigation paths (e.g. hallways, doors, etc.). The isolation module 132 may continuously process the environmental data as received by the sensors 110, 111 and/or the AR device 112. Pre-capturing and identifying each object in the environment can speed up the isolation of the object to keep up with the conversation.

Referring still to FIG. 1, the determining module 133 includes one or more components of hardware and/or software program code for determining a confusion level of the target user based on a use of the word in the conversation. For instance, the determination module 133 determines whether the target user is confused when the word is spoken in conversation. The confusion level is based on the user's reaction to hearing the word and the user's reaction to seeing the object associated with the word in the augmented reality environment. The target user's reactions are captured by sensors 110, 111 and/or by cameras, sensors, microphones, etc. of the AR device 112. For example, the AR device 112 camera may detect the facial expression of the target user and conclude that the user is confused by the use of the word, with a degree of confidence. The AR device 112 camera may later detect that the confused facial expression based on hearing the word has changed to an interested facial expression based on seeing the object in the environment. The change in facial expressions can affect the confusion level of the target user, impacting which augmented reality technique to implement in the moment. Further, sensors of the AR device 112, such as an accelerometer or gyroscope, can provide data regarding a movement of a body part of the target user that suggests confusion, such as a tilt of the head (if the target user AR device is being worn on the head), or a movement of the hand to head (if the target user AR device is being worn on a wrist).

Further factors are considered to determine a confusion level of the user, such as mobility behavior of the target user and biometric data of the target user. The mobility behavior of the target user is analyzed to determine whether the user is confused or interested in the conversation. For example, if the target user is walking away from the conversation or turning away from the isolated object, the determination module 133 concludes that the user is confused, which could have harmful effects to the development of speech or language learning. Biometric data can be used to determine a level of confusion, such as a heart rate, a perspiration content, accelerometer data indicative of gestures of confusion, such as hand being raised to the head.

The determining module 133 optionally applies a scheme to quantify a confusion level of the user into a numerical score. The numerical score can be weighted by confidence scores, and can include a plurality of factors that contribute to the confusion of the user. The score is determined by data collected by a plurality of sensors and input devices to provide a plurality of target user metrics based on a plurality of factors related to the target user and the target user's behavior/actions. The metrics may be based on a historical learning system or real-time data relating to a person's individual characteristics, as compared with the profiles in the profiles database 113. The profiles database 113 is accessed by the determination module 133 as part of the calculation of the confusion score of the target user. The target user's speech is gathered, and development assessed and scored overtime w.r.t target user with similar profiles. The score output from the AI algorithm applying the profile data is utilized by the determining module 133 for calculating the confusion score in specific scenarios for a specific target user.

For each detection of the mixed language word, the determining module 133 calculates a confusion score that can be applied to a pre-determined threshold. If the confusion score exceeds the threshold, then a first augmented reality technique is implemented. If the confusion score is below the threshold, then a second augmented reality technique is implemented that is different than the first augmented reality technique.

The implementation module 134 includes one or more components of hardware and/or software program code for implementing an augmented reality technique based on the confusion level of the target user. Based on the level of confusion level, the implementation module 134 predicts whether a real time translation will be preferable for the target user or moving the target user away the surrounding conversation will be preferable. The implementation module 134 improves over time and is a self-learning module which assesses the improvement of the target user's speech and combining that factor with the confusion score. For example, if the target user is able to pick up multiple languages, real time translation will be weighted higher in view of the confusion score. If the target user is struggling and getting confused with the same objects being referred with multiple words from different languages and the speech development is hampered, real time translation will be weighted lower in view of the confusion score. Accordingly, the implementation module 134 modifies the confusion score based on a deeper understanding of the target user's recent accomplishments and struggles with speech development and/or language learning; the data for analyzing the improvements, struggles, accomplishments, etc. come from the profile database 113 that is constantly updated over time. Alternatively, the implementation module 134 determines which augmented reality technique to implement based solely on the confusion score.

If the target user's confusion level is low enough based on the pre-determine threshold, the implementation module 134 implements a first augmented reality technique. The first augmented reality technique is designed to provide the target user with a translation of the word being used in the conversation in combination with the isolation of the object to advance the learning of the language. For example, the first augmented reality technique includes rendering a text translation of the word in the augmented reality of the target user, which assists the target user in learning the word in multiple languages. The AR device 112 displays a text translation next to or near the object isolated in the target user's environment so that the target user can be assisted to learn the word in multiple languages. Because the confusion level of the target user is examined, the risk of overly confusing the target user by displaying more information pertaining to the mixed language word is avoided.

If the target user's confusion level exceeds the pre-determined threshold, the implementation module 134 implements a second augmented reality technique that is different than the first augmented reality technique. The second augmented reality technique is designed to distract the target user from the conversation. For example, the second augmented reality technique includes initiating an augmented reality game within the augmented reality of the target user to distract the target user from the conversation. The implementation module 134 dynamically creates a gaming context within the augmented reality of the target user that navigates the target user away from the first speaker and the second speaker by controlling a movement of the target user with a game or object rendered by the AR device 112; a distance that the target user is navigated away from the conversation correlates to a loudness of the conversation. For example, the louder the conversation, the further away the game will take the user. The target user, by playing the AR game, physically moves away from the conversation to avoid confusion or detrimental effects to the target user's speech development and/or language learning.

Figure 3:
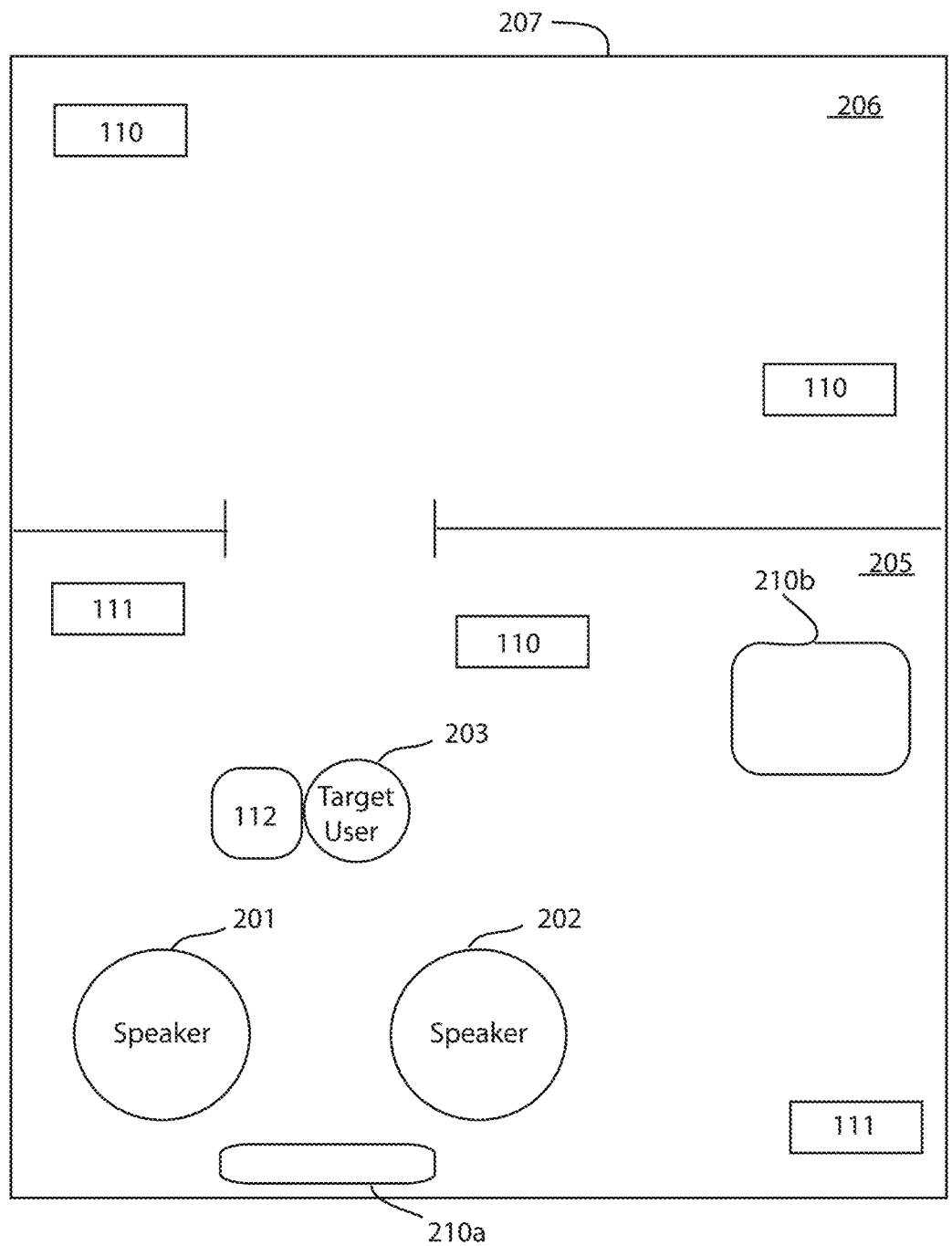
FIG. 3 depicts the environment of FIG. 2, in which objects have been identified in the environment, in accordance with embodiments of the present invention.
Figure 4:
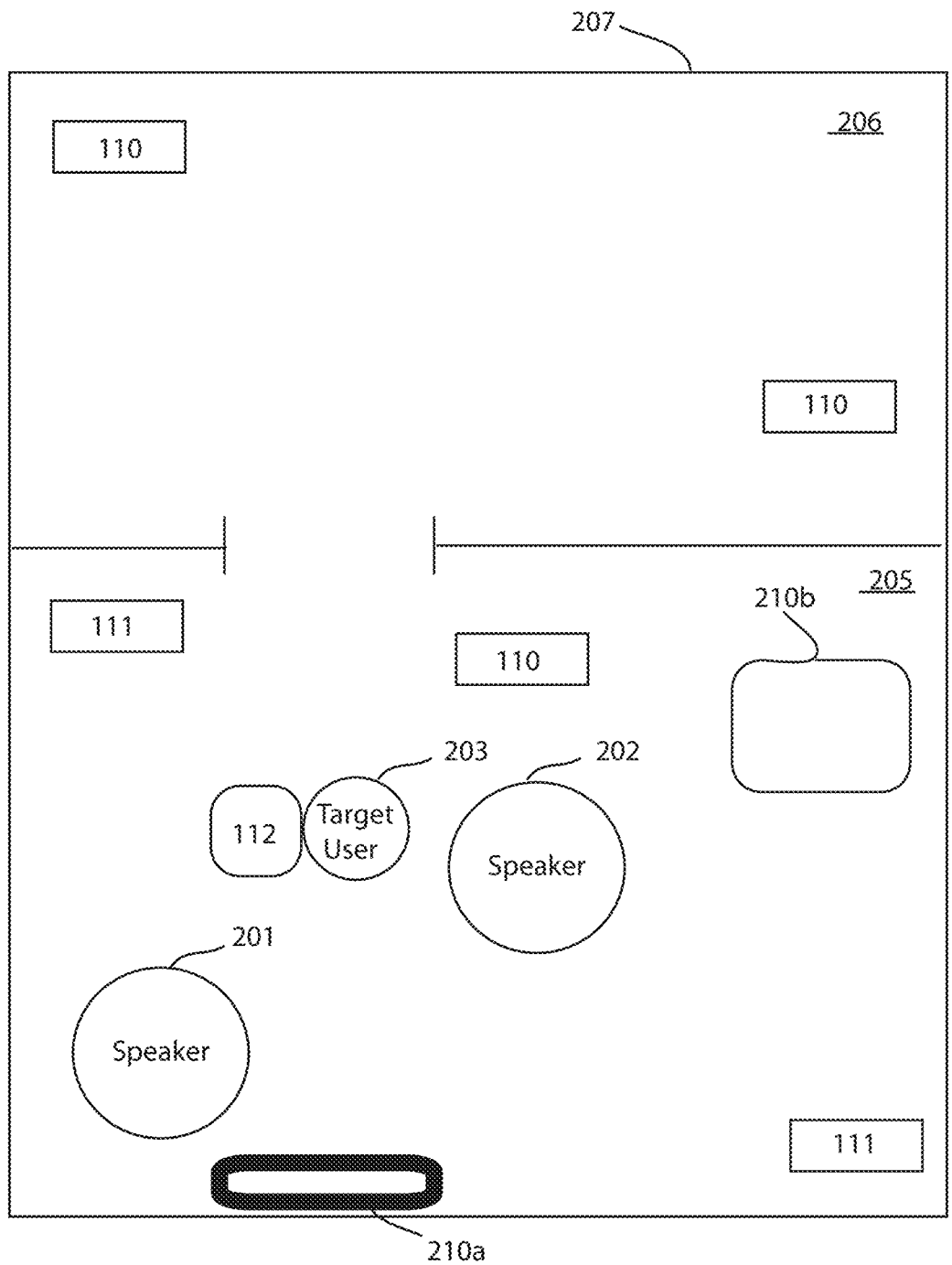
FIG. 4 depicts the environment of FIG. 3, in which an object is isolated, in accordance with embodiments of the present invention.

An exemplary embodiment of the system 100 will now be described with reference to FIGS. 3-9. FIG. 3 depicts the environment 207 of FIG. 2, in which objects have been identified within the environment, in accordance with embodiments of the present invention. In the illustrated embodiment, objects 210a and 210b have been identified in the environment 207 in the manner described above. Object 210a is a television and object 201b is a table. FIG. 4 depicts the environment 207 of FIG. 3, in which an object is isolated, in accordance with embodiments of the present invention. Object 210a is isolated because the first speaker 201 and the second speaker 202 were discussing watching a movie together. By way of example, the first speaker 201 states, "Why don't we watch the new comic book movie on the living room televisión." In response to the detection that the word "televisión" is in a different language than the other words in the sentence, the system isolates object 210a in the augmented reality of the target user, shown as heavier line thickness in FIG. 4. The system analyzes the confusion level of the target user based on the user of the word "televisión" and the reaction of seeing the object 210a highlighted in the augmented reality.

Figure 5:
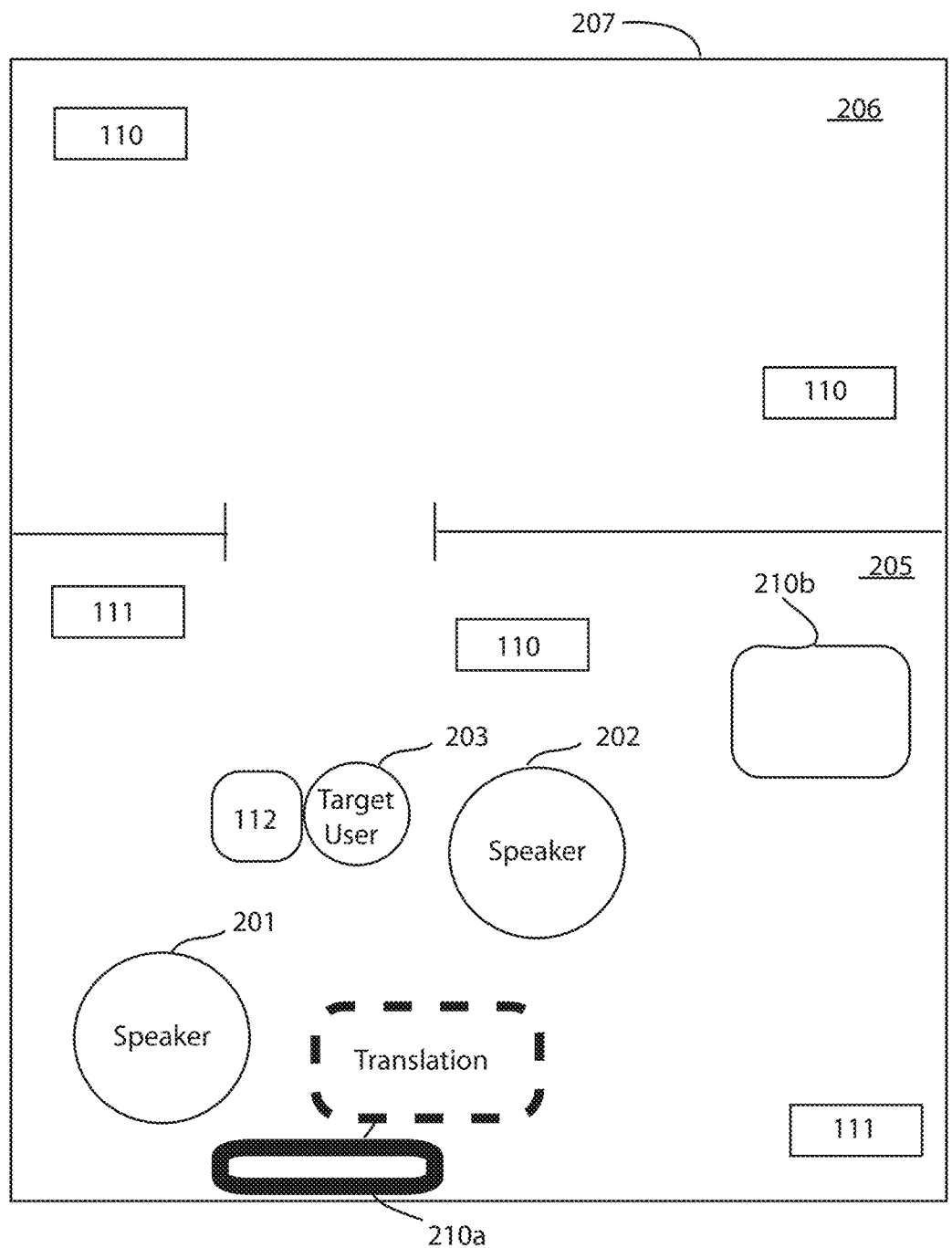
FIG. 5 depicts implementation of a first augmented reality technique, in accordance with embodiments of the present invention.

FIG. 5 depicts implementation of a first augmented reality technique, in accordance with embodiments of the present invention. In the illustrated embodiment, the system has determined that the confusion level of the target user is below the threshold, and thus renders the translation in the augmented reality of the target user near the object 210a. The rendering of the translation into another language can assist the target user to learn the word for the isolated object in multiple languages.

Figure 6:
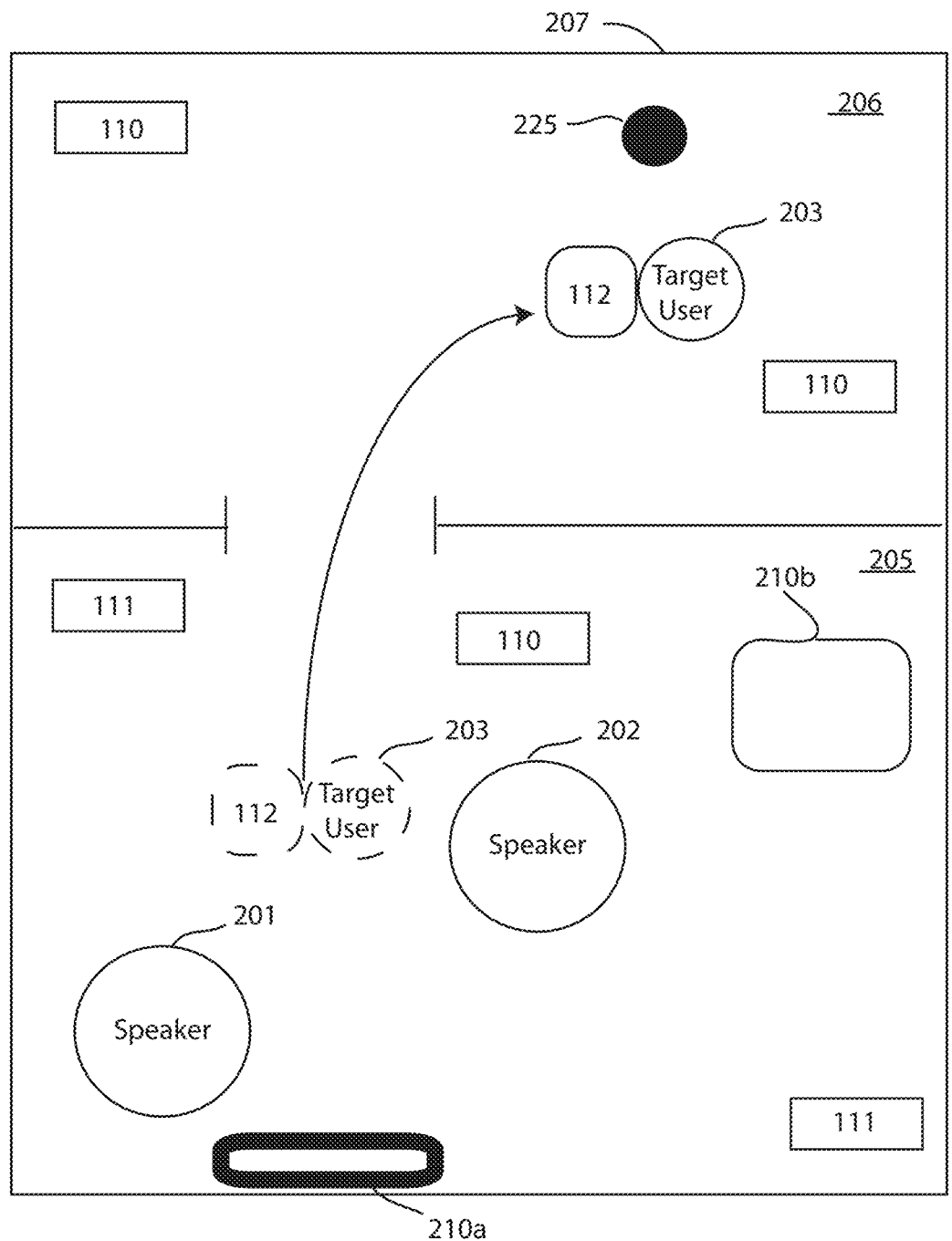
FIG. 6 depicts implementation of a second augmented reality technique, in accordance with embodiments of the present invention.

FIG. 6 depicts implementation of a second augmented reality technique, in accordance with embodiments of the present invention. In the illustrated embodiment, the system has determined that the confusion level of the target user is above the threshold, and thus initiates a dynamic AR-based game for the target user to play. The AR game generates object 225 that can move around the environment and draw the target user away from the conversation between the speakers 201, 202. As shown in FIG. 6, the target user 203 is in space 205 of the environment 207. The dynamic AR game controls the movement of the target user by enticing the target user to follow the object 225 into space 206, away from the conversation between the speakers 201, 202.

Figure 7:
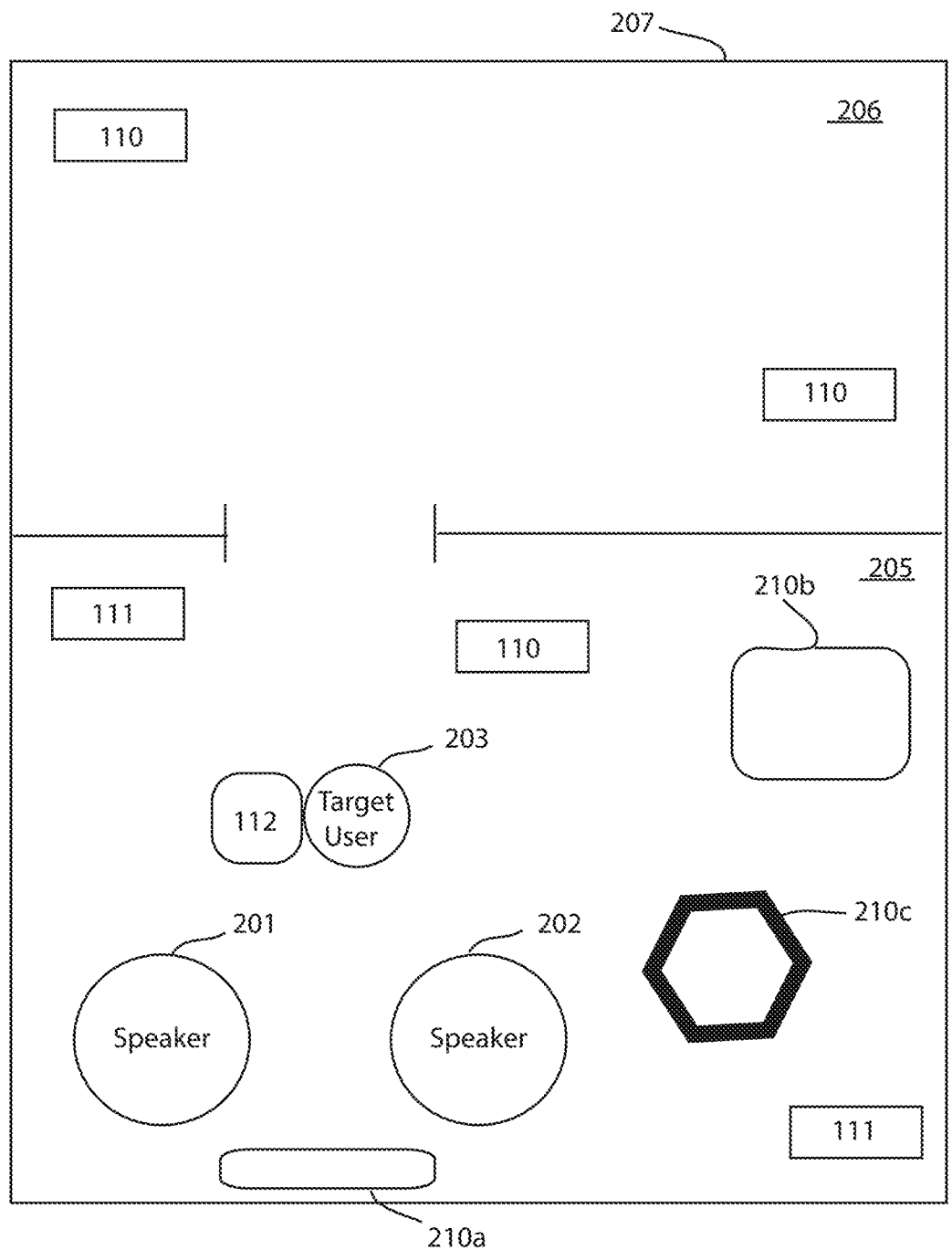
FIG. 7 depicts the environment of FIG. 2, in which an object has been generated, in accordance with embodiments of the present invention.

FIG. 7 depicts the environment 207 of FIG. 2, in which an object has been generated, in accordance with embodiments of the present invention. In the illustrated embodiment, the first speaker 201 states, "We need to place a new silla in the corner of our living room." In response to the detection that the word "silla" (chair) is in a different language than the other words in the sentence, the system searches for a chair in the environment. Because a chair is not located in the environment, the system generates object 210*c* which is rendered as a chair in the augmented reality environment of the target user 203, and isolates object 210*c*, shown as heavier line thickness in FIG. 7. The system analyzes the confusion level of the target user based on the user of the word "silla" and the reaction of seeing the object 210*c* highlighted in the augmented reality.

Figure 8:
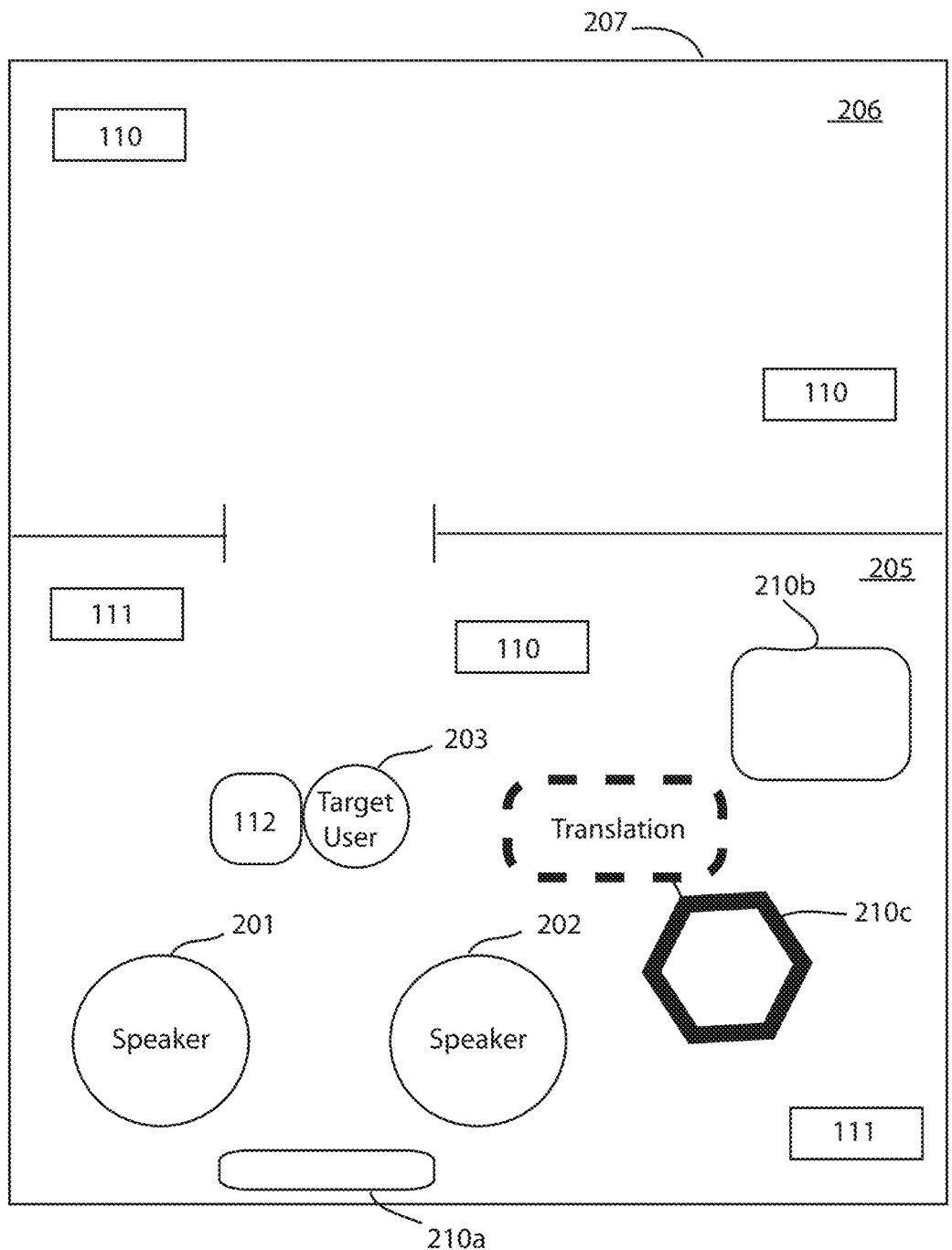
FIG. 8 depicts another implementation of the first augmented reality technique, in accordance with embodiments of the present invention.

FIG. 8 depicts another implementation of a first augmented reality technique, in accordance with embodiments of the present invention. In the illustrated embodiment, the system has determined that the confusion level of the target user is below the threshold, and thus renders the translation in the augmented reality of the target user near the generated object 210*c*. The rendering of the translation into another language can assist the target user to learn the word for the isolated object in multiple languages.

Figure 9:
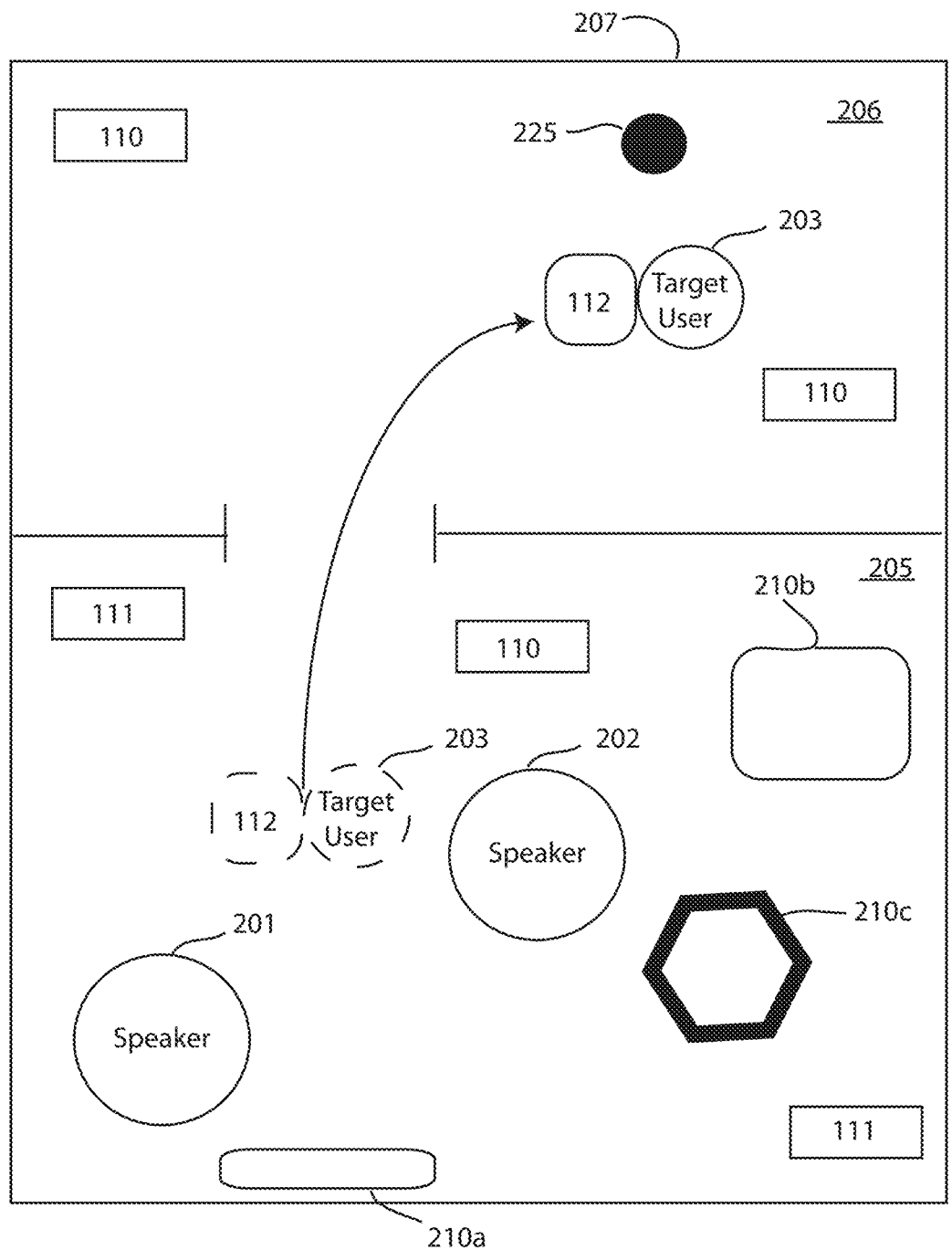
FIG. 9 depicts another implementation of the second augmented reality technique, in accordance with embodiments of the present invention.

FIG. 9 depicts another implementation of the second augmented reality technique, in accordance with embodiments of the present invention. In the illustrated embodiment, the system has determined that the confusion level of the target user is above the threshold, and thus initiates a dynamic AR-based game for the target user to play. The AR game generates object 225 that can move around the environment and draw the target user away from the conversation between the speakers 201, 202. As shown in FIG. 9, the target user 203 is in space 205 of the environment 207. The dynamic AR game controls the movement of the target user by enticing the target user to follow the object 225 into space 206, away from the conversation between the speakers 201, 202.

Various tasks and specific functions of the modules of the computing system 120 may be performed by additional modules, or may be combined into other modules(s) to reduce the number of modules. Further, an embodiment of the computer or computer system 120 comprises specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry includes proprietary specially designed components (e.g., a specialized integrated circuit, such as for example an Application Specific Integrated Circuit (ASIC), designed for only implementing methods of the present invention).

Furthermore, the augmented reality system 100 uses specific hardware, such as augmented reality devices (e.g. smart contact lenses, eyeglasses), for displaying AR environments and augmentations to the AR environment. The AR displayed by the augmented reality devices can be augments according to specific set of rules that are uniquely applied to each user. The augmented reality system 100 provides a technical solution by augmenting AR environments displayed by specialized devices based on a set of specific rules associated with a confusion level of a user.

Figure 10:
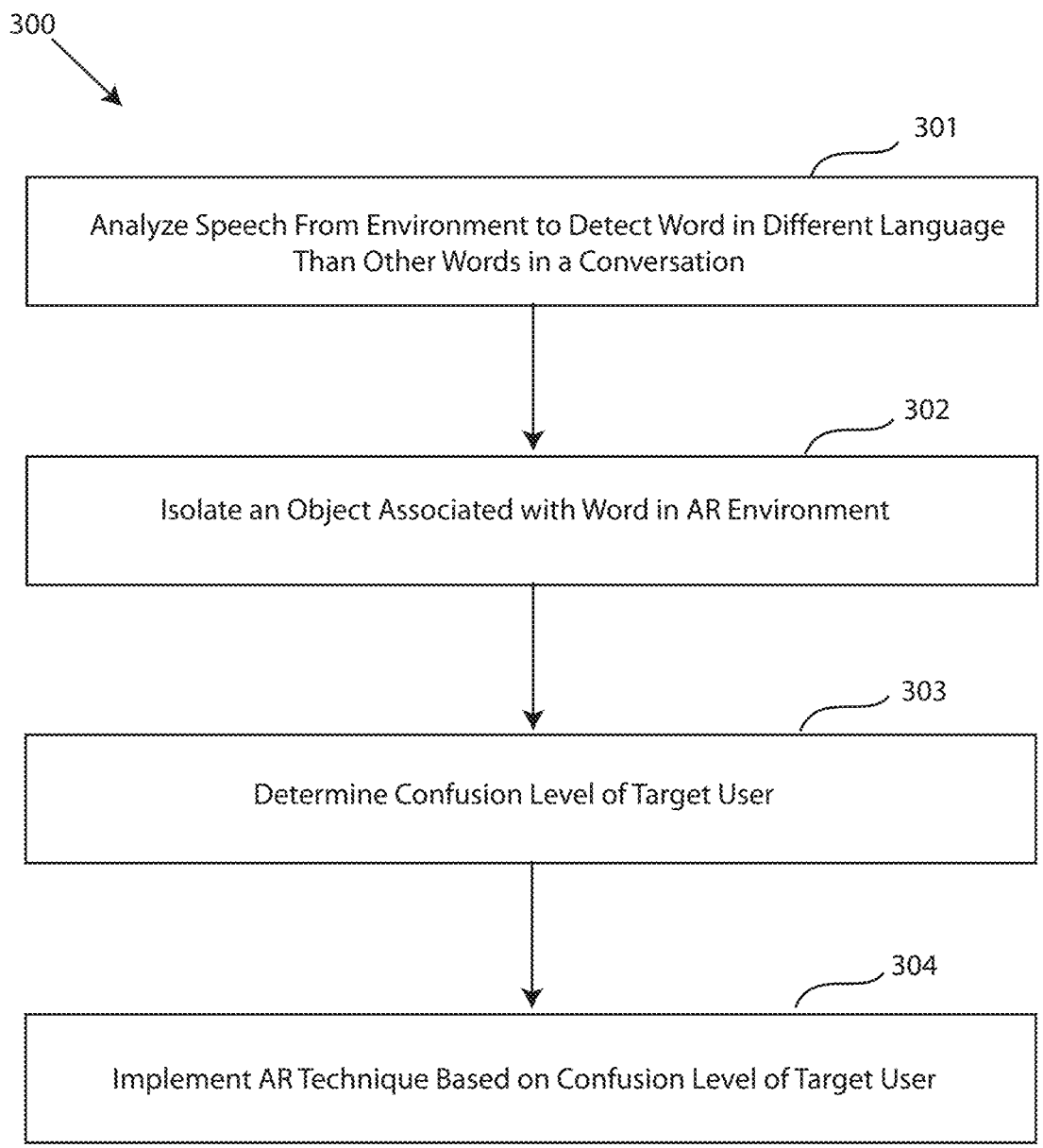
FIG. 10 depicts a flow chart of a method for using augmented reality for assisting speech development of multiple languages, in accordance with embodiments of the present invention.

Referring now to FIG. 10, which depicts a flow chart of a method 300 for using augmented reality for assisting speech development of multiple languages, in accordance with embodiments of the present invention. One embodiment of a method 300 or algorithm that may be implemented for using augmented reality for assisting speech development of multiple languages with the augmented reality system 100 described in FIGS. 1-9 using one or more computer systems as defined generically in FIG. 12 below, and more specifically by the specific embodiments of FIG. 1.

Embodiments of the method 300 for using augmented reality for assisting speech development of multiple languages, in accordance with embodiments of the present invention, may begin at step 301 wherein step 301 analyzes speech from an environment to detects word(s) in different languages than other words in the speech. Step 302 isolates an object that is associated with or correlates with the word in an AR environment. Step 303 determines a confusion level of the user. Step 304 implements an AR technique based on the confusion level of the user.

Figure 11:
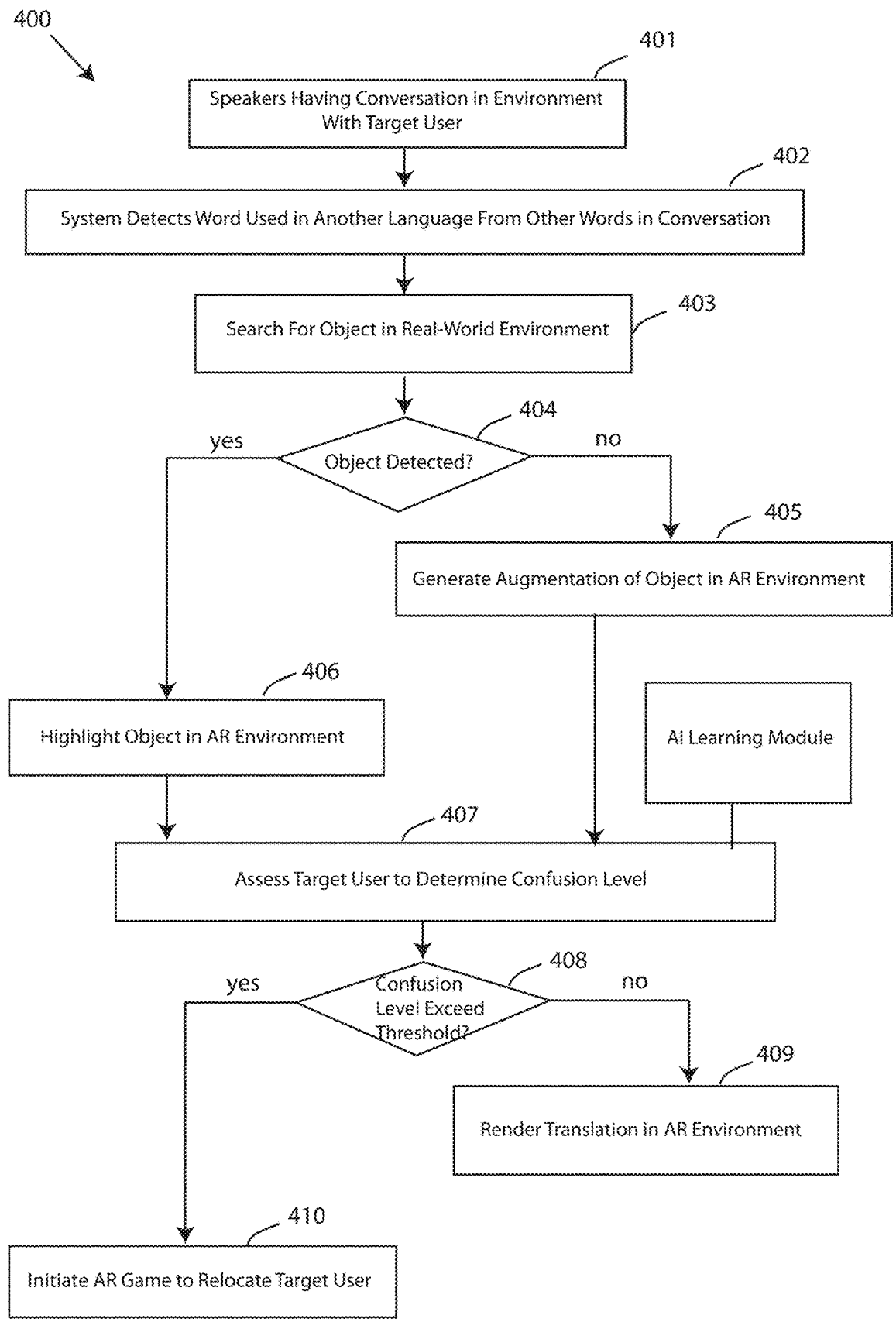
FIG. 11 depicts a detailed flow chart for using augmented reality for assisting speech development of multiple languages, in accordance with embodiments of the present invention.

FIG. 11 depicts a detailed flow chart of a method 400 for using augmented reality for assisting speech development of multiple languages, in accordance with embodiments of the present invention. At step 401, two or more speakers have a conversation in an environment that also includes a target user that is learning a language or undergoing speech development in more than one language. At step 402, the system detects a word from a sentence of the conversation that is spoken in another language from the other words in the sentence or conversation. Step 403 searches for an object in the environment that correlates with the detected word spoken in the different language than the other words. Step 404 determines whether an object can be located in the physical environment. If no, step 405 generates the object within the environment using augmented reality. If yes, then step 406 highlights the physical object using augmented reality. Step 407 assesses the user to determine a confusion level of the user. Step 408 determines whether the confusion level or score exceeds a predetermined threshold, which can vary over time as the user improves. If no, then step 409 renders a translation in the AR environment using augmented reality. If yes, then step 410 initiates an AR-based game to relocate the user.

Figure 12:
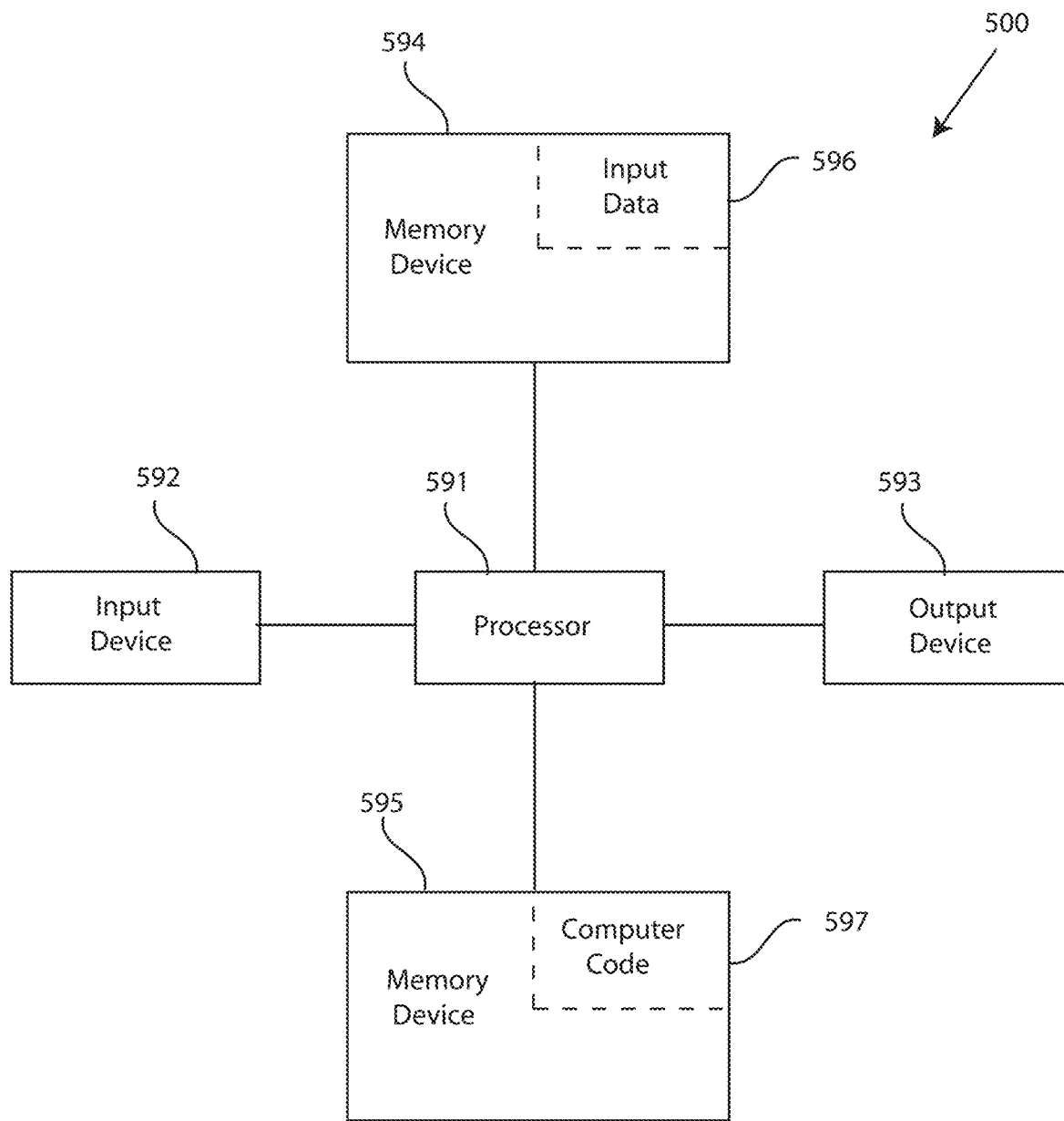
FIG. 12 depicts a block diagram of a computer system for an augmented reality system of FIGS. 1-9, capable of implementing a method for using augmented reality for assisting speech development of multiple languages of FIGS. 10-11, in accordance with embodiments of the present invention.

FIG. 12 depicts a block diagram of a computer system for the augmented reality system 100 of FIGS. 1-9, capable of implementing methods for using augmented reality for assisting speech development of multiple languages of FIGS. 10-11, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for using augmented reality for assisting speech development of multiple languages in the manner prescribed by the embodiments of FIGS. 10-11 using the augmented reality system 100 of FIGS. 1-9, wherein the instructions of the computer code 597 may be executed by processor 591 via memory device 595. The computer code 597 may include software or program instructions that may implement one or more algorithms for implementing the method for using augmented reality for assisting speech development of multiple languages, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 12.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to using augmented reality for assisting speech development of multiple languages. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to use augmented reality for assisting speech development of multiple languages. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a for using augmented reality for assisting speech development of multiple languages. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for using augmented reality for assisting speech development of multiple languages.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
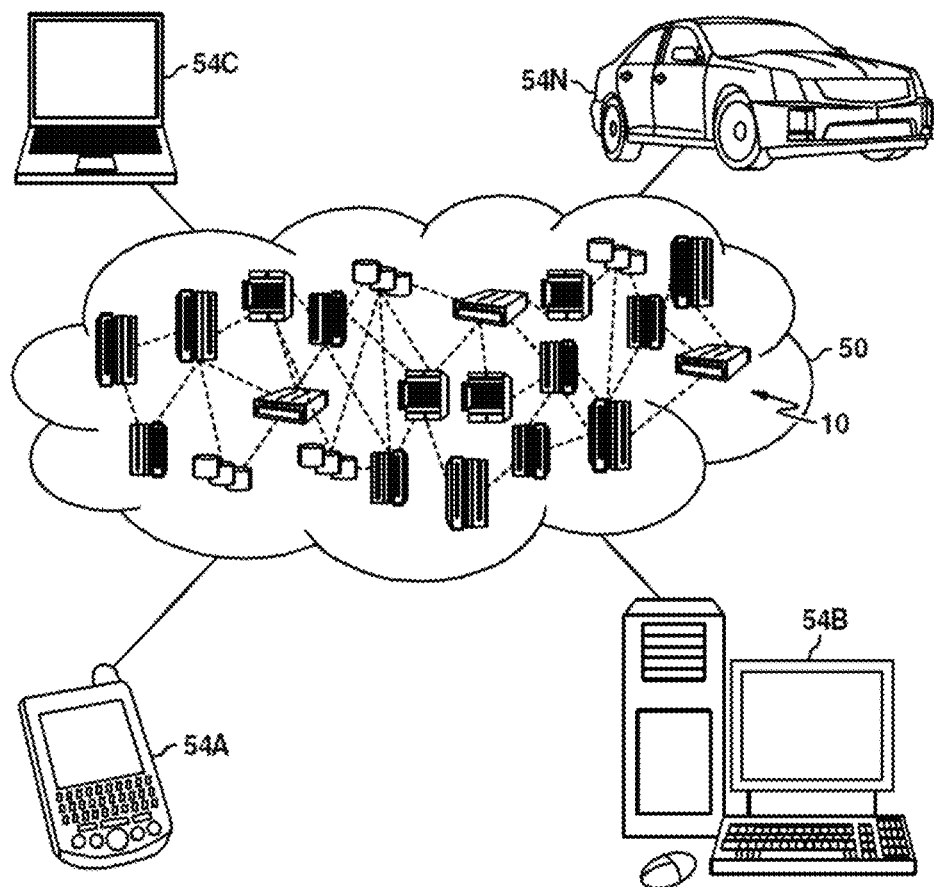
FIG. 13 depicts a cloud computing environment, in accordance with embodiments of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 13 are intended to be illustrative only and that computing nodes 10 and cloud computing environment 50 can communicate with any type of computerized device over any type of network and/or network addressable connection (e.g., using a web browser).

Figure 14:
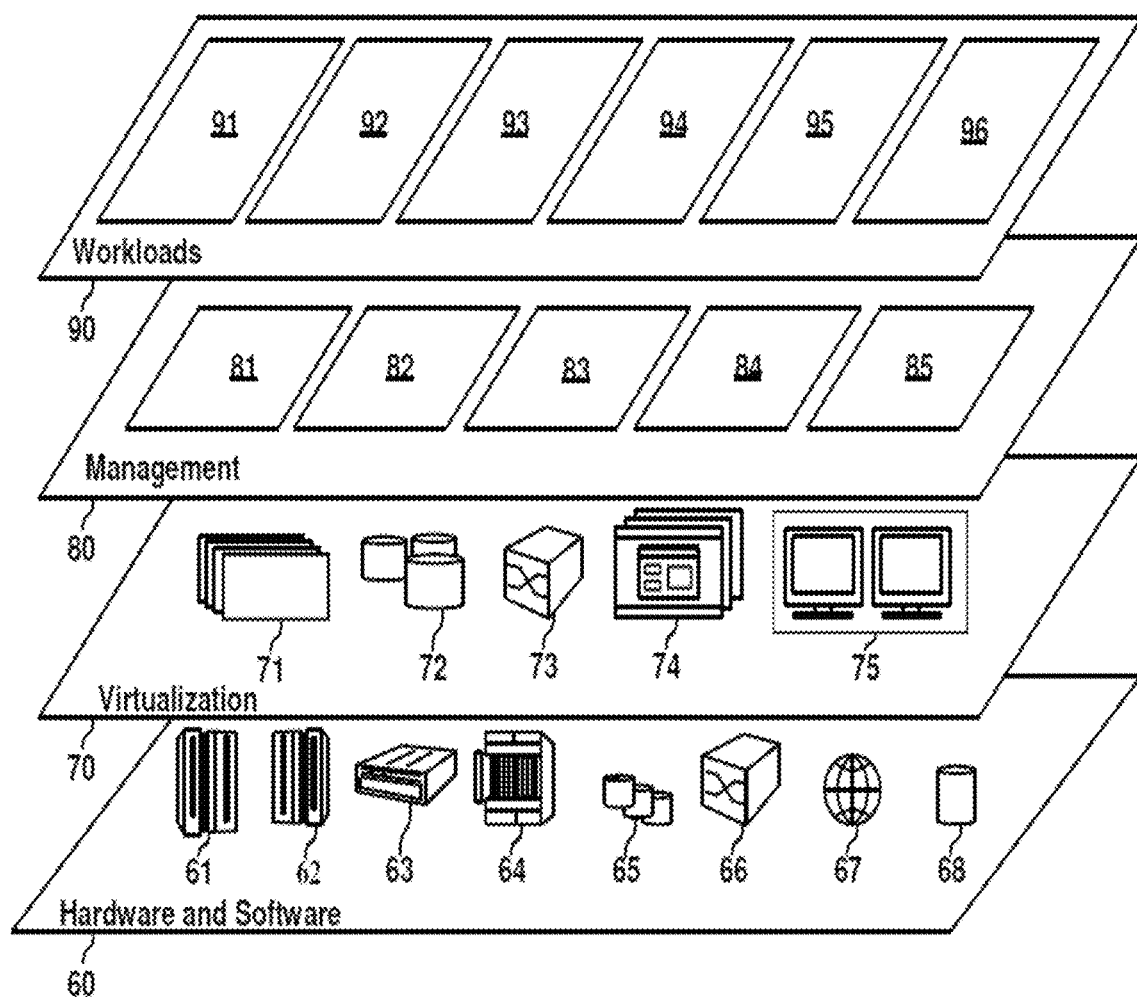
FIG. 14 depicts abstraction model layers, in accordance with embodiments of the present invention.

Referring now to FIG. 14, a set of functional abstraction layers provided by cloud computing environment 50 (see FIG. 13) are shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GUI and augmented reality 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

The invention claimed is:

1. A method comprising:
analyzing, by a processor of a computing system, speech recorded in a real-world environment to detect a word used in a conversation between a first speaker and a second speaker that is in a language different from other words in the conversation, wherein a target user is in the real-world environment with the first speaker and the second speaker;
isolating, by the processor, an object associated with the word within an augmented reality environment of the target user located in the real-world environment;
determining, by the processor, a confusion level of the target user based on a use of the word in the conversation; and
implementing, by the processor, an augmented reality technique based on the confusion level of the target user, wherein the augmented reality technique includes:
initiating, by the processor, an augmented reality game within the augmented reality of the target user to distract the target user from the conversation, the initiating the augmented reality game includes:
dynamically creating, by the processor, a gaming context within the augmented reality of the target user that navigates the target user away from the first speaker and the second speaker;
wherein a distance that the target user is navigated away from the conversation correlates to a loudness of the conversation.

2. The method of claim 1, wherein the augmented reality technique includes: rendering, by the processor, a text translation of the word in the augmented reality of the target user, which assists the target user in learning the word in multiple languages.

3. The method of claim 1, wherein the isolating includes: searching, by the processor, for an object in the environment that correlates to the word detected as a function of the analyzing, by processing environmental data received from a plurality of input mechanisms installed in an environment; and alerting, by the processor, the target user to a location of the object within the environment.

4. The method of claim 1, wherein the isolating includes: generating, by the processor, an object in the augmented reality environment of the target user that correlates to the word detected as a function of the analyzing.

5. The method of claim 1, wherein the confusion level of the target user is predicted by detecting a mobility behavior and a facial expression of the target user in response to isolating the object associated with the word.

6. A computing system, comprising:
a processor;
a memory device coupled to the processor; and
a computer readable storage device coupled to the processor, wherein the storage device contains program code executable by the processor via the memory device to implement a method comprising:
analyzing, by a processor of a computing system, speech recorded in a real-world environment to detect a word used in a conversation between a first speaker and a second speaker that is in a language different from other words in the conversation, wherein a target user is in the real-world environment with the first speaker and the second speaker;
isolating, by the processor, an object associated with the word within an augmented reality environment of the target user located in the real-world environment;
determining, by the processor, a confusion level of the target user based on a use of the word in the conversation; and
implementing, by the processor, an augmented reality technique based on the confusion level of the target user, wherein the augmented reality technique includes:
initiating, by the processor, an augmented reality game within the augmented reality of the target user to distract the target user from the conversation, the initiating the augmented reality game includes:
dynamically creating, by the processor, a gaming context within the augmented reality of the target user that navigates the target user away from the first speaker and the second speaker;
wherein a distance that the target user is navigated away from the conversation correlates to a loudness of the conversation.

7. The computing system of claim 6, wherein the augmented reality technique includes: rendering, by the processor, a text translation of the word in the augmented reality of the target user, which assists the target user in learning the word in multiple languages.

8. The computing system of claim 6, wherein the isolating includes: searching, by the processor, for an object in the environment that correlates to the word detected as a function of the analyzing, by processing environmental data received from a plurality of input mechanisms installed in an environment; and alerting, by the processor, the target user to a location of the object within the environment.

9. The computing system of claim 6, wherein the isolating includes: generating, by the processor, an object in the augmented reality environment of the target user that correlates to the word detected as a function of the analyzing.

10. The computing system of claim 6, wherein the confusion level of the target user is predicted by detecting a mobility behavior and a facial expression of the target user in response to isolating the object associated with the word.

11. The computing system of claim 6, further comprising: creating, by the processor, a profile of the target user over time, and comparing the profile of the target user to a database of profiles of other target users to assist in determining the confusion level of the target user.

12. A computer program product, comprising a computer readable hardware storage device storing a computer readable program code, the computer readable program code comprising an algorithm that when executed by a computer processor of a computing system implements a method comprising:

analyzing, by a processor of a computing system, speech recorded in a real-world environment to detect a word used in a conversation between a first speaker and a second speaker that is in a language different from other words in the conversation, wherein a target user is in the real-world environment with the first speaker and the second speaker;

isolating, by the processor, an object associated with the word within an augmented reality environment of the target user located in the real-world environment;

determining, by the processor, a confusion level of the target user based on a use of the word in the conversation; and implementing, by the processor, an augmented reality technique based on the confusion level of the target user, wherein the augmented reality technique includes:

initiating, by the processor, an augmented reality game within the augmented reality of the target user to distract the target user from the conversation, the initiating the augmented reality game includes:

dynamically creating, by the processor, a gaming context within the augmented reality of the target user that navigates the target user away from the first speaker and the second speaker;

wherein a distance that the target user is navigated away from the conversation correlates to a loudness of the conversation.

13. The computer program product of claim 12, wherein the augmented reality technique includes: rendering, by the processor, a text translation of the word in the augmented reality of the target user, which assists the target user in learning the word in multiple languages.

14. The computer program product of claim 12, wherein the isolating includes: generating, by the processor, an object in the augmented reality environment of the target user that correlates to the word detected as a function of the analyzing.

* * * * *